(12) United States Patent
Burmester (10) Patent No.: US 10,738,939 B2
(45) Date of Patent: Aug. 11, 2020

(54) MODULAR ROTATABLE LINK

(71) Applicants: Ergonomic Solutions Manufacturing A/S, Norresundby (DK); Ergonomic Solutions International Limited, Epsom (GB)

(72) Inventor: Benny Burmester, Norresundby (DK)

(73) Assignees: ERGONOMIC SOLUTIONS INTERNATIONAL LIMITED, Epsom (GB); ERGONOMIC SOLUTIONS MANUFACTURING A/S, Norresundby (DK)

( * ) Notice: Subject to any disclaimer, the term of this patent is extended or adjusted under 35 U.S.C. 154(b) by 441 days.

(21) Appl. No.: 15/535,970

(22) PCT Filed: Sep. 1, 2015

(86) PCT No.: PCT/DK2015/000035
§ 371 (c)(1),
(2) Date: Jun. 14, 2017

(87) PCT Pub. No.: WO2016/095916
PCT Pub. Date: Jun. 23, 2016

(65) Prior Publication Data
US 2017/0343154 A1 Nov. 30, 2017

(30) Foreign Application Priority Data

Dec. 15, 2014 (DK) .................................. 2014 00730

(51) Int. Cl.
*F16C 11/10* (2006.01)
*F16M 11/10* (2006.01)
(Continued)

(52) U.S. Cl.
CPC ......... *F16M 13/022* (2013.01); *F16C 11/103* (2013.01); *F16M 11/10* (2013.01); *F16M 11/2014* (2013.01); *Y10T 403/32581* (2015.01)

(58) Field of Classification Search
CPC ....... F16C 11/10; F16C 11/103; F16C 11/106; F16M 11/10; F16M 11/14;
(Continued)

(56) References Cited

U.S. PATENT DOCUMENTS

| 2,439,195 A | * | 4/1948 | Witmyer | ............... A61F 2/6607 403/114 |
| 3,081,114 A | * | 3/1963 | Esty | ........................ F16B 9/026 403/76 |

(Continued)

FOREIGN PATENT DOCUMENTS

| DE | 29706838 U1 * | 7/1997 | ............. F16M 11/40 |
| EP | 1552169 B1 | 3/2008 | |
| FR | 2812931 A1 | 2/2002 | |

OTHER PUBLICATIONS

International Search Report; European Patent Office; International Application No. PCT/DK2015/000035; dated Jan. 29, 2016; 3 pages.

(Continued)

*Primary Examiner* — Josh Skroupa
(74) *Attorney, Agent, or Firm* — Berg Hill Greenleaf Ruscitti LLP (57) ABSTRACT

A modular rotatable link for use for a plate on which a piece of hardware, such as a card terminal or tablet, may be secured. The modular rotatable link comprises a base section, a rotation ring, a body section, and a fastener. The body section may be of different form and functionality.

9 Claims, 7 Drawing Sheets

(51) Int. Cl.
*F16M 11/20* (2006.01)
*F16M 13/02* (2006.01)

(58) Field of Classification Search
CPC .......... F16M 11/2014; F16M 11/2021; F16M 11/40; F16M 13/022; Y10T 403/32196; Y10T 403/32311; Y10T 403/32565; Y10T 403/32576; Y10T 403/32581; Y10T 403/32639; Y10T 403/32704; Y10T 403/32762; Y10T 403/32811; Y10T 403/32975
USPC ... 403/76, 90, 114, 115, 116, 123, 131, 138, 403/144, 164; 248/160, 176.3, 274.1, 248/276.1
See application file for complete search history.

(56) References Cited

U.S. PATENT DOCUMENTS

| | | | |
|---|---|---|---|
| 3,168,274 A * | 2/1965 | Street .................... | F16M 11/40 248/176.3 |
| 3,584,822 A | 6/1971 | Oram | |
| 3,958,904 A * | 5/1976 | Rusbach .............. | F16C 11/106 403/90 |
| 4,273,461 A * | 6/1981 | Kjellstrand ........... | F16C 11/106 403/123 |
| 5,807,010 A * | 9/1998 | Parker ................. | B60G 21/0551 403/116 |
| 5,881,985 A * | 3/1999 | Hoenig .................. | F16M 11/10 248/371 |
| 7,209,344 B2 * | 4/2007 | Hillman ................. | F16M 11/10 248/917 |
| 8,224,485 B2 * | 7/2012 | Unsworth ............. | F16M 11/14 700/245 |
| 9,464,663 B2 * | 10/2016 | Belleau ............... | F16C 11/0623 |
| 2003/0086240 A1 | 5/2003 | Jobs et al. | |
| 2005/0161568 A1 * | 7/2005 | Hwang ................. | F16M 11/10 248/231.91 |
| 2013/0048427 A1 * | 2/2013 | Sordo .................... | F16M 11/14 182/110 |
| 2016/0151920 A1 * | 6/2016 | Nakata .................. | F16M 11/14 74/490.06 |

OTHER PUBLICATIONS

Written Opinion of the International Searching Authority; International Application No. PCT/DK2015/000035; dated Jan. 29, 2016; 5 pages.

* cited by examiner

MODULAR ROTATABLE LINK

CROSS-REFERENCE TO RELATED APPLICATIONS

This application is a U.S. National Phase of International PCT Application No. PCT/DK2015/000035 filed on Sep. 1, 2015, which claims priority to Denmark Patent Application No, 201400730 filed on Dec. 15, 2014, the contents of each application are herein incorporated by reference in their entirety.

TECHNICAL FIELD OF THE INVENTION

The present invention relates to a rotatable link for use for a plate on which a piece of hardware, such as a card terminal or tablet may be secured.

BACKGROUND OF THE INVENTION

It is an object of the present invention to provide a compact rotatable link, which may e.g. be incorporated in an upright, for use for a plats on which a piece of hardware, such as a card terminal or tablet, may be secured. The plate should be moved by hand in a rotary movement, preferably in a sideways movement, as well as in an up-and-down movement.

It is also an object of the invention to provide a compact rotatable link that can be tilted. In addition to being sufficiently slack to be affected by hand, it should also be suitably tight, so that a plate with a tablet mounted on the rotatable link maintains its position after forces have been exerted by hand.

EP1552169 discloses a rotatable link, which may e.g. be incorporated in an upright. Compressive forces caused by a mechanical tension in a pipe are transferred via two first objects to a second object clamped between them. The two first objects are secured and partly built info the pipe, and the second object is rotatable relative to the pipe. The second object constitutes a rotatable link part on which a plated may be welded to provide an upright.

SUMMARY OF THE INVENTION

One aspect relates to a modular rotatable link comprising a base section, a rotation ring, a body section, and a fastener; wherein the base section comprises:
a) a base unit with a cable channel at least partly formed therein;
b) an elongated member with a first end attached to the base unit, and with a second end configured to be removably received by the fastener; and
c) a stop pin with a first end attached to the base unit;
wherein the body section comprises a bottom part configured for rotatably engaging with the rotation ring;
wherein the bottom part of the body section comprises:
a) a channel configured for rotatably engaging with the elongated member of the base section;
b) a cable channel in communication with the cable channel of the base section; and
c) a rotation limiting channel configured for rotatably engaging with the stop pin of the base section.

Disclosed herein is a modular rotatable link. The modular rotatable link comprises a base section, a rotation ring, a body section, and a fastener.

The base section comprises a base unit with a cable channel at least partly formed therein. The cable channel is formed such that cables provided for the hardware will not be pinched or kinked during the rotation of the link.

The base section also comprises an elongated member with a first end attached to the base unit, and with a second end configured to be removably received by the fastener. The center axis of the elongated member provides the axis of rotation of the rotatable link. The elongated member may e.g. be a stud bolt.

In one or more embodiments, the elongated member is positioned on the base unit such that its center axis provides the axis of rotation of the rotatable link.

In one or more embodiments, the cable channel at least partly formed in the base unit extends around the circumference of the elongated member.

In one or more embodiments, the cable channel at least partly formed in the base unit extends around the circumference of the elongated member in an arc of 10-358 degrees, such as within the range of 20-355 degrees, e.g. within the range of 30-350 degrees, such as within the range of 35-345 degrees, e.g. within the range of 40-340 degrees, such as within the range of 45-335 degrees, e.g. within the range of 50-330 degrees, such as within the range of 55-325 degrees, e.g. within the range of 60-315 degrees, such as within the range of 65-305 degrees, e.g. within the range of 70-300 degrees, such as within the range of 75-295 degrees, e.g. within the range of 80-290 degrees, such as within the range of 85-285 degrees, e.g. within the range of 90-280 degrees, such as within the range of 95-275 degrees, e.g. within the range of 100-270 degrees, such as within the range of 105-265 degrees, e.g. within the range of 110-260 degrees, such as within the range of 115-255 degrees, e.g. within the range of 120-250 degrees, such as within the range of 125-245 degrees, e.g. within the range of 130-240 degrees, such as within the range of 135-235 degrees, e.g. within the range of 140-230 degrees, such as within the range of 145-225 degrees, e.g. within the range of 150-220 degrees, such as within the range of 155-215 degrees, e.g. within the range of 160-205 degrees, such as within the range of 165-200 degrees, e.g. within the range of 170-195 degrees, such as within the range of 175-190 degrees, e.g. within the range of 180-185 degrees.

In one or more embodiments, the cable channel at least partly formed in the base unit extends around the circumference of the axis of rotation of the rotatable link in an arc of 10-358 degrees, such as within the range of 20-355 degrees, e.g. within the range of 30-350 degrees, such as within the range of 35-345 degrees, e.g. within the range of 40-340 degrees, such as within the range of 45-335 degrees, e.g. within the range of 50-330 degrees, such as within the range of 55-325 degrees, e.g. within the range of 60-315 degrees, such as within the range of 65-305 degrees, e.g. within the range of 70-300 degrees, such as within the range of 75-295 degrees, e.g. within the range of 80-290 degrees, such as within the range of 85-285 degrees, e.g. within the range of 90-280 degrees, such as within the range of 95-275 degrees, e.g. within the range of 100-270 degrees, such as within the range of 105-265 degrees, e.g. within the range of 110-260 degrees, such as within the range of 115-255 degrees, e.g. within the range of 120-250 degrees, such as within the range of 125-245 degrees, e.g. within the range of 130-240 degrees, such as within the range of 135-235 degrees, e.g. within the range of 140-230 degrees, such as within the range of 145-225 degrees, e.g. within the range of 150-220 degrees, such as within the range of 155-215 degrees, e.g. within the range of 160-205 degrees, such as within the range of 165-200 degrees, e.g. within the range of 170-195 degrees, such as within the range of 175-190 degrees, e.g. within the range of 180-185 degrees.

The base section also comprises a stop pin with a first end attached to the base unit. The stop pin is present to avoid that the link can rotate more than at most 358 degrees around its center axis, preferably less. Else, the cables provided for the hardware will be pinched or kinked during the rotation of the link.

The body section comprises a bottom part configured for rotatably engaging with the rotation ring. It is crucial that a rotation ring is present, such that the rotatable link can rotate without making unwanted noise. Furthermore, the rotation ring stabilizes the body section and prevent tear of the same.

The bottom part of the body section comprises a channel configured for rotatably engaging with the elongated member of the base section.

The bottom part of the body section also comprises a cable channel in communication with the cable channel of the base section.

The bottom part of the body section also comprises rotation limiting channel configured for rotatably engaging with the stop pin of the base section. When the stop pin reaches an end of the rotation limiting channel, the body section will not be able to rotate further in that direction.

In one or more embodiments, the rotation limiting channel extends around the circumference of the channel configured for rotatably engaging with the elongated member of the base section.

In one or more embodiments, the rotation limiting channel extends around the circumference of the channel configured for rotatably engaging with the elongated member of the base section in an arc of 10-358 degrees, such as within the range of 20-355 degrees, e.g. within the range of 30-350 degrees, such as within the range of 35-345 degrees, e.g. within the range of 40-340 degrees, such as within the range of 45-335 degrees, e.g. within the range of 50-330 degrees, such as within the range of 55-325 degrees, e.g. within the range of 60-315 degrees, such as within the range of 65-305 degrees, e.g. within the range of 70-300 degrees, such as within the range of 75-295 degrees, e.g. within the range of 80-290 degrees, such as within the range of 85-285 degrees, e.g. within the range of 90-280 degrees, such as within the range of 95-275 degrees, e.g. within the range of 100-270 degrees, such as within the range of 105-265 degrees, e.g. within the range of 110-260 degrees, such as within the range of 115-255 degrees, e.g. within the range of 120-250 degrees, such as within the range of 125-245 degrees, e.g. within the range of 130-240 degrees, such as within the range of 135-235 degrees, e.g. within the range of 140-230 degrees, such as within the range of 145-225 degrees, e.g. within the range of 150-220 degrees, such as within the range of 155-215 degrees, e.g. within the range of 160-205 degrees, such as within the range of 165-200 degrees, e.g. within the range of 170-195 degrees, such as within the range of 175-190 degrees, e.g. within the range of 180-185 degrees.

In one or more embodiments, the rotation limiting channel extends around the circumference of the axis of rotation of the rotatable link in an arc of 10-358 degrees, such as within the range of 20-355 degrees, e.g. within the range of 30-350 degrees, such as within the range of 35-345 degrees, e.g. within the range of 40-340 degrees, such as within the range of 45-335 degrees, e.g. within the range of 50-330 degrees, such as within the range of 55-325 degrees, e.g. within the range of 60-315 degrees, such as within the range of 65-305 degrees, e.g. within the range of 70-300 degrees, such as within the range of 75-295 degrees, e.g. within the range of 80-290 degrees, such as within the range of 85-285 degrees, e.g. within the range of 90-280 degrees, such as within the range of 95-275 degrees, e.g. within the range of 100-270 degrees, such as within the range of 105-265 degrees, e.g. within the range of 110-260 degrees, such as within the range of 115-255 degrees, e.g. within the range of 120-250 degrees, such as within the range of 125-245 degrees, e.g. within the range of 130-240 degrees, such as within the range of 135-235 degrees, e.g. within the range of 140-230 degrees, such as within the range of 145-225 degrees, e.g. within the range of 150-220 degrees, such as within the range of 155-215 degrees, e.g. within the range of 160-205 degrees, such as within the range of 165-200 degrees, e.g. within the range of 170-195 degrees, such as within the range of 175-190 degrees, e.g. within the range of 180-185 degrees.

It is also an object of the invention to provide a compact rotatable link that can be tilted.

In one or more embodiments, the body section further comprises a tilt insert and a tilt part, and where the tilt insert faces the bottom part.

The tilt insert tiltably supports the tilt part, and the tilt part is tiltably mounted on the tilt insert. The tilt insert comprises a channel configured for rotatably engaging with the elongated member of the base section; and the tilt part comprises a channel configured for rotatably and tiltably engaging with the elongated member of the base section. Hence, it is only the tilt part that is tiltable in relation to the elongated member.

In one or more embodiments, channel of the bottom section configured for rotatably engaging with the elongated member of the base section extends into an (e.g. cylindrical) elongated member configured for engaging with the channel of the tilt insert configured for rotatably engaging with the elongated member of the base section. This allows for a compact system for engagement between the bottom section and the tilt insert.

In one or more embodiments, the tilt insert, the rotation ring, the bottom section of the body part, the body part, the base unit and/or the fastener is concentric with the elongated member.

In one or more embodiments, the body section further comprises a tilt insert and a tilt part; wherein the tilt insert faces the bottom part; wherein the tilt insert comprises a channel configured for rotatably engaging with the elongated member of the base section;
wherein the tilt part comprises a channel configured for rotatably and tiltably engaging with the elongated member of the base section;
wherein the tilt insert has a first surface side and a second surface side;
wherein the first surface side is opposite to the second surface side;
wherein the first surface side is a curved convex surface tiltably supporting the tilt part;
wherein the tilt part has a first surface side and a second surface side;
wherein the first surface side is opposite to the second surface side;
wherein the second surface side is a curved concave surface configured for tiltably mounting and sliding on the first surface side of the tilt insert.

In one or more embodiments, the bottom part has a first surface side and a second surface side; wherein the first surface side is opposite to the second surface side; wherein a part of the first surface side is configured for slideable supporting the curved concave surface of the tilt part.

In one or more embodiments, the body section further comprises a tilt part;
wherein the tilt part faces the bottom part;
wherein the tilt part comprises a channel configured for rotatably and tiltably engaging with the elongated member of the base section;
wherein the bottom part has a first surface side and a second surface side;
wherein the first surface side is opposite to the second surface side;
wherein the first surface side is a curved convex surface tiltably supporting the tilt part;
wherein the tilt part has a first surface side and a second surface side;
wherein the first surface side is opposite to the second surface side;
wherein the second surface side is a curved concave surface configured for tiltably mounting and sliding on the first surface side of the bottom part.

The inventors have prepared a special fastener suitable for both rotation and tilting operations. In one or more embodiments, the fastener comprises a spring washer system and a lock nut. In one or more embodiments, the fastener comprises a hard metal (e.g. steel) spring washer, two soft metal or metal alloy (e.g. bronze) spring washers, a soft metal or metal alloy spring lock washer (e.g. bronze), and a lock nut.

In one or more embodiments, at least a the part of the first surface side of the tilt part comprising the channel configured for rotatably and tiltably engaging with the elongated member of the base section is a curved convex surface; wherein the fastener comprises a curved washer configured for slidably engaging with the part of the first surface side of the tilt part comprising the channel configured for rotatably and tiltably engaging with the elongated member of the base section; and
wherein the curved washer comprises a channel configured for rotatably engaging with the elongated member of the base section.

In one or more embodiments the curved washer is also configured for engaging with the channel configured for rotatably and tiltably engaging with the elongated member of the base section. By moving within and along the channel during a tilting operation, the channel aids in stabilizing the curved washer during such operation.

In one or more embodiments the fastener comprises a washer system and a lock nut.

In one or more embodiments, the washer system comprises two washers of a soft metal or metal alloy, such as bronze, facing each other.

In one or more embodiments the base unit is mounted in a tube, and wherein the tube is configured to support and accommodate at least a part of the rotation ring. In one or more embodiments, the tube is configured as an angled tube. The angled tube may be of any angle, preferably from 5-90 degrees.

In one or more embodiments, a part of the body section is configured as an angled tube. The angled tube may be of any angle, preferably from 5-90 degrees.

In one or more embodiments, the rotation ring, the till insert and/or the curved washer comprises polyoxymethylene or similar polymers. Polyoxymethylene (POM), also known as acetal, polyacetal and polyformaldehyde is an engineering thermoplastic used in precision parts that require high stiffness, low friction and excellent dimensional stability. Like many other synthetic polymers, it is produced by different chemical firms with slightly different formulas and is therefore sold under many commercial names such as Delrin, Celcon, Hostaform, etc.

POM is characterized by its high strength, hardness and rigidity to about 40° C. POM has a density of $\rho=1.410\text{-}1.420$ g/cm$^3$ and is intrinsically opaque white, due to its highly crystalline composition. POM is a tough material with a very low coefficient of friction, high abrasion resistance, high heat resistance and low water absorption. It is dimensionality stable under exposure to moisture and heat; resistant to chemicals, solvents, flexing and creep; and has a high gloss and low friction surface.

POM is commercially supplied in a granulated form and can be formed into the desired shape by applying heat and pressure. The two most common forming methods employed are injection molding and extrusion. Rotational molding and blow molding are also possible.

When supplied as extruded bar or sheet, POM may be machined using traditional methods such as turning, milling, drilling etc.

Other engineering plastics and thermoplastics may also be used to fabricate the rotation ring, the tilt insert and/or the curved washer.

DETAILED DESCRIPTION OF THE INVENTION

Figure 1:
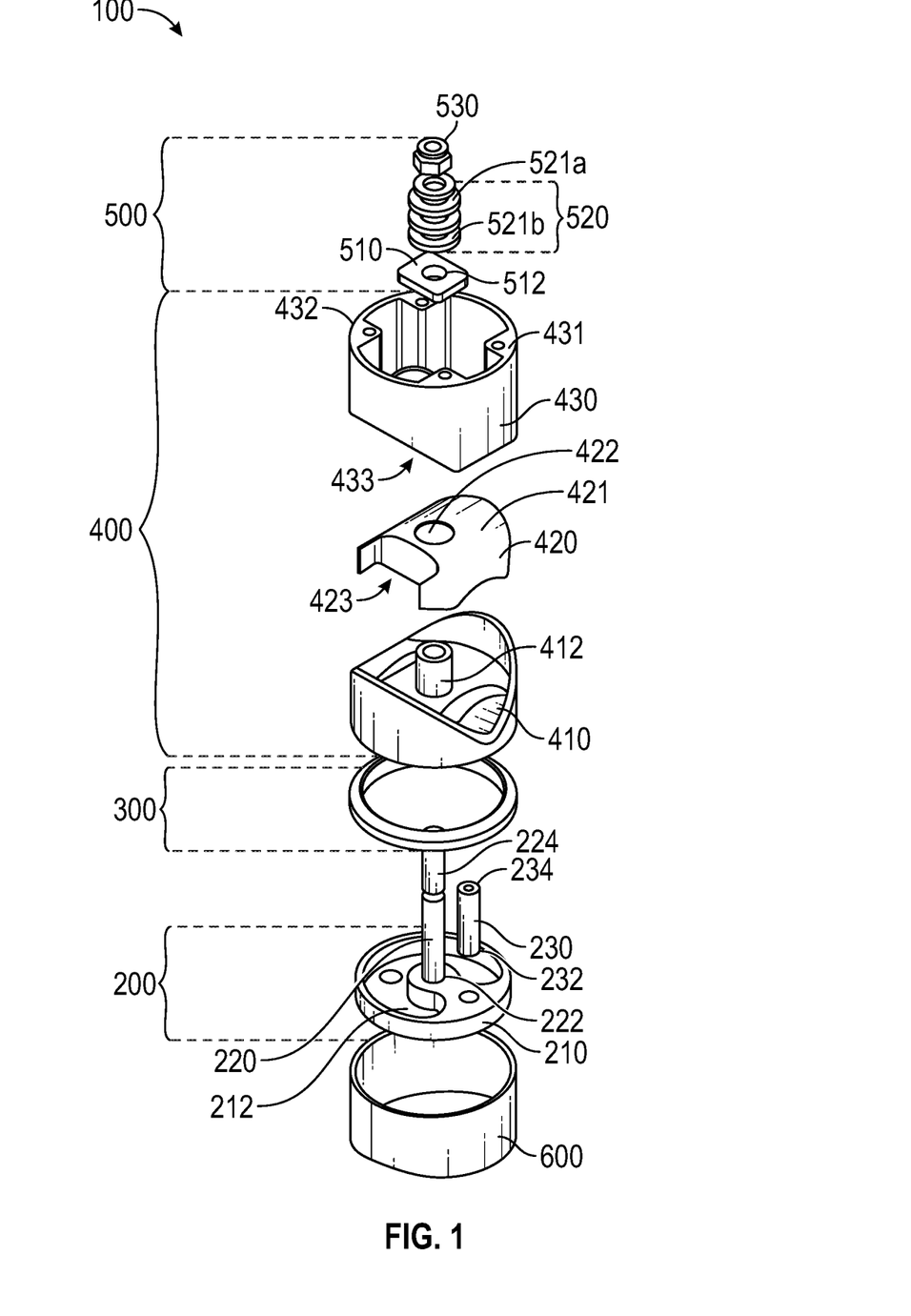
FIG. 1 shows a rotatable link with tilt function in exploded view in accordance with various embodiments of the invention.

Referring to FIG. 1, the general scheme of the invention is shown in exploded view. FIG. 1 shows a modular rotatable link (100) comprising a base section (200), a rotation ring (300), a body section (400), and a fastener (500).

The base section (200) comprises a base unit (210) with a cable channel (212) at least partly formed therein.

The base section (200) also comprises an elongated member (220) with a first end (222) attached to the base unit (210), and with a second end (224) configured to be removably received by the fastener (500). The elongated member (220) is welded at its first end (222) to the base unit (210), and is only threaded at its second end (224) for receiving a lock nut (530). The remaining of the elongated member (220) is unthreaded to provide a surface suitable for rotatable engagement with the other components. The elongated member (220) is positioned at the center of the base unit (210).

The base section (200) also comprises a stop pin (230) with a first end (232) attached to the base unit (210).

The body section (400) comprises a bottom part (410) configured for rotatably engaging with the rotation ring (300).

The bottom part (410) of the body section (400) comprises a channel (412) configured for rotatably engaging with the elongated member (220) of the base section (200).

The bottom part (410) of the body section (400) also comprises a cable channel (414) in communication with the cable channel (212) of the base section (200). The cable channel (212) is formed in the base unit (210) and extends in an arc around the circumference of the elongated member (220).

Figure 2:
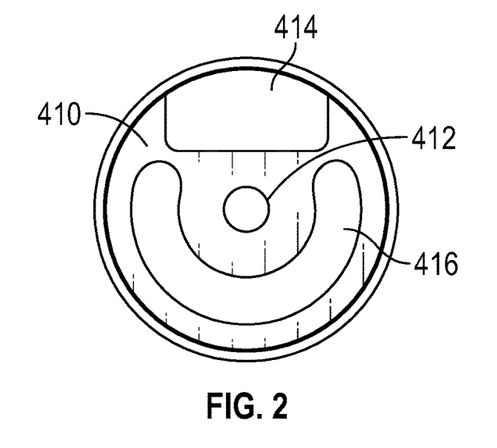
FIG. 2 shows a bottom view of the bottom part of the body section in accordance with various embodiments of the invention.

The bottom part (410) of the body section (400) also comprises a rotation limiting channel (416) configured for rotatably engaging with the stop pin (230) of the base section (200). The rotation limiting channel (416) extends in an arc around the circumference of the channel (412) configured for rotatably engaging with the elongated member (220) of the base section (200) (FIG. 2).

The body section (400) further comprises a tilt insert (420) and a tilt part (430).

The tilt insert faces the bottom part (410); and comprises a channel (422) configured for rotatably engaging with the elongated member (220) of the base section (200).

The tilt insert (420) has a first surface side (421) and a second surface side (423). The first surface side (421) is opposite to the second surface side (423); and the first surface side (421) is a curved convex surface tiltably supporting the tilt part (430).

Figure 3A:
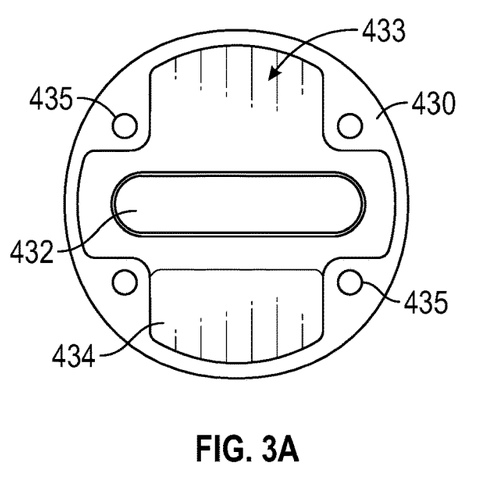
FIG. 3A+B shows a top view of the tilt part of the body section in accordance with various embodiments of the invention.
Figure 3B:
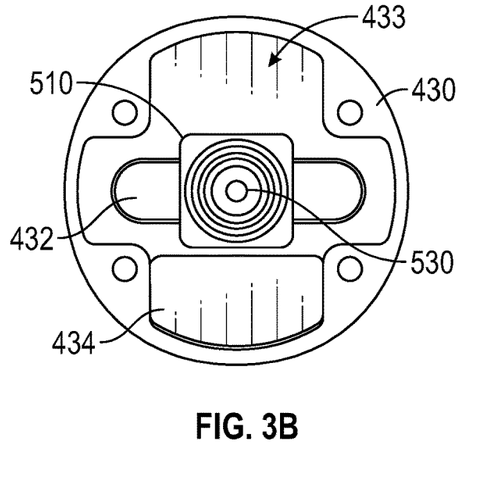

The tilt part (430) comprises a channel (432) configured for rotatably and tiltably engaging with the elongated member (220) of the base section (200) (FIG. 3A). Thereby, the tilt part is capable of tilting relative to the other components that are only able to rotate around the elongated member (220) (FIG. 3B).

The tilt part (430) has a first surface side (431) and a second surface side (433); and the first surface side (431) is opposite to the second surface side (433). The second surface side (433) is a curved concave surface configured for tiltably mounting and sliding on the first surface side (421) of the tilt insert (420).

Figure 8:
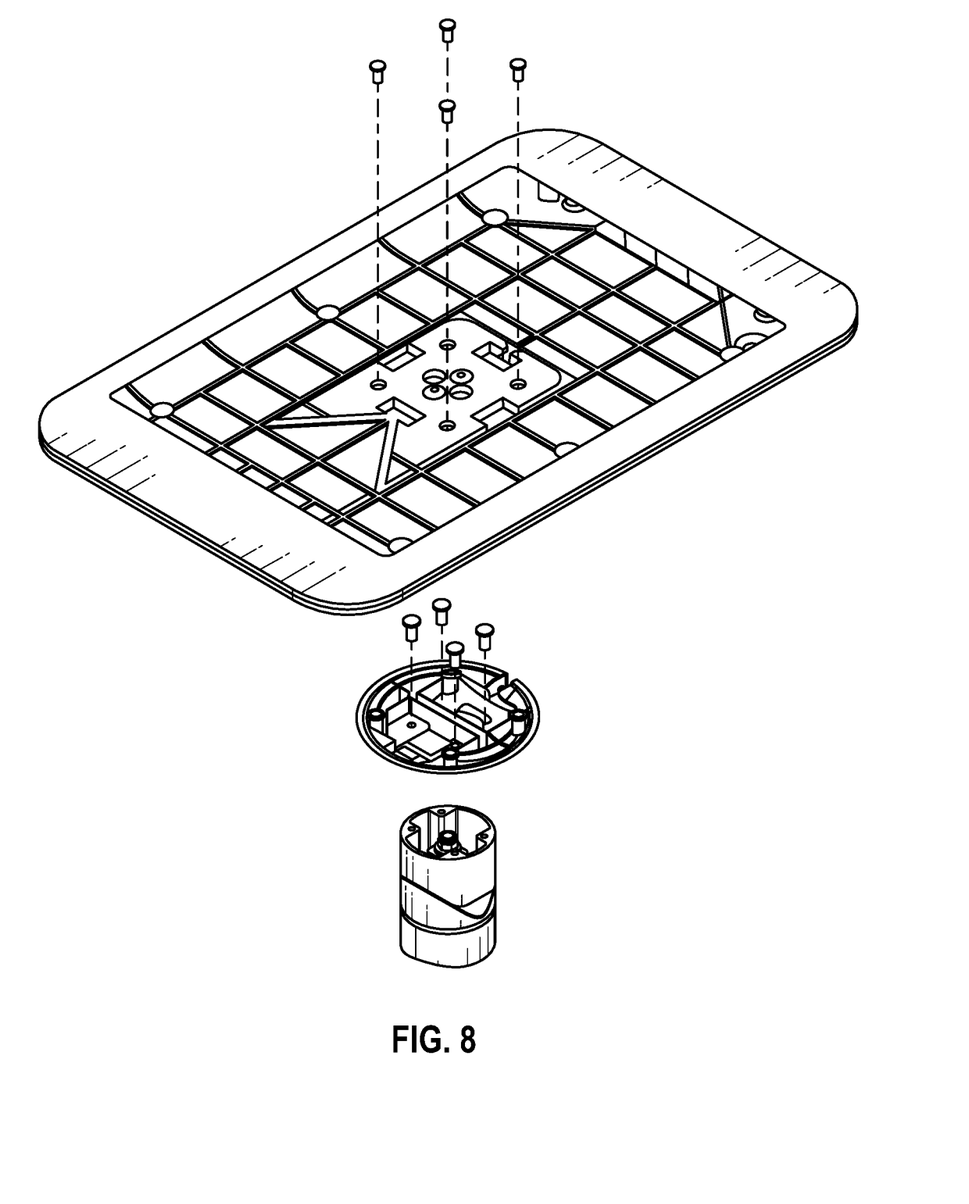
FIG. 8 shows an exploded perspective view of a rotatable link with tilt function in accordance with various embodiments of the invention.

The first surface side (431) is provided with four threaded holes (435) for mounting a plate on which a piece of hardware, such as a card terminal or tablet, may be secured (FIG. 3A+B). The mounting is shown in FIG. 8.

A part of the first surface side (431) of the tilt part (430) comprising the channel (432) configured for rotatably and tiltably engaging with the elongated member (220) of the base section (200) is a curved convex surface.

The inventors have prepared a special fastener suitable for both rotation and tilting operations. The fastener (500) comprises a spring washer system (520) and a lock nut (530). The fastener system is shown (from bottom to top of the link) with a curved washer (510), a hard metal (e.g. steel) spring washer, two soft metal or metal alloy (e.g. bronze) spring washers (521A+B), a soft metal or metal alloy spring lock washer (e.g. bronze), and a lock nut (530).

The curved washer (510) is configured for slideably engaging with the part of the first surface side (431) of the tilt part (430) comprising the channel (432) configured for rotatably and tiltably engaging with the elongated member (220) of the base section (200).

The curved washer (510) comprises a channel (512) configured for rotatably engaging with the elongated member (220) of the base section (200).

Figure 4A:
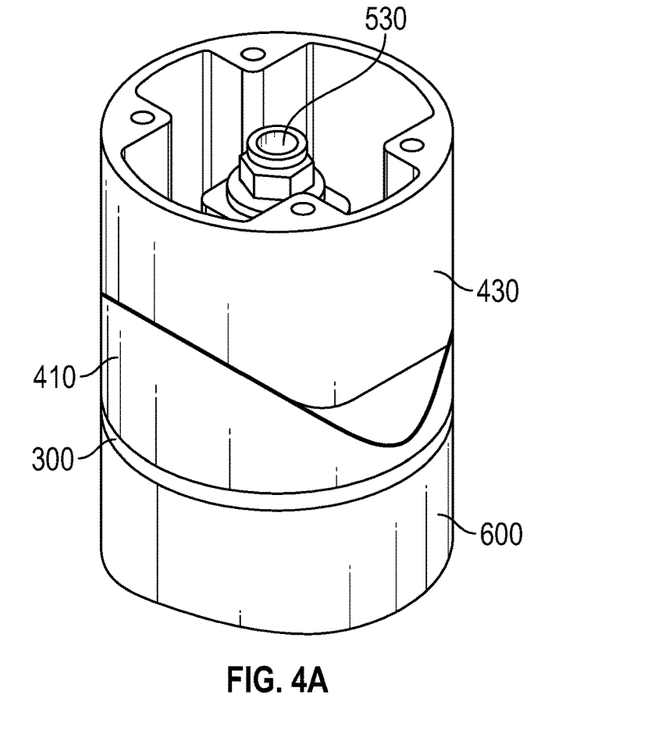
FIG. 4A shows an assembled version of a rotatable link with tilt function in accordance with various embodiments of the invention.
Figure 4B:
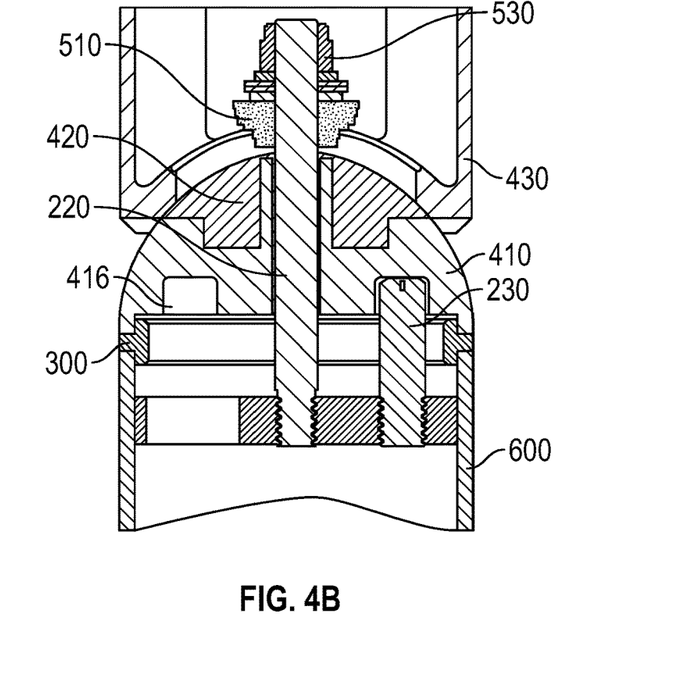
FIG. 4B shows a cross-section of FIG. 4A.

The base unit (210) is mounted in a tube (600), and the tube (600) is configured to support and accommodate a part of the rotation ring (300). FIG. 4A shows an assembled version of a rotatable link with tilt function. The base unit is mounted in a tube (600). FIG. 4B shows a cross-section of FIG. 4A.

Figure 5:
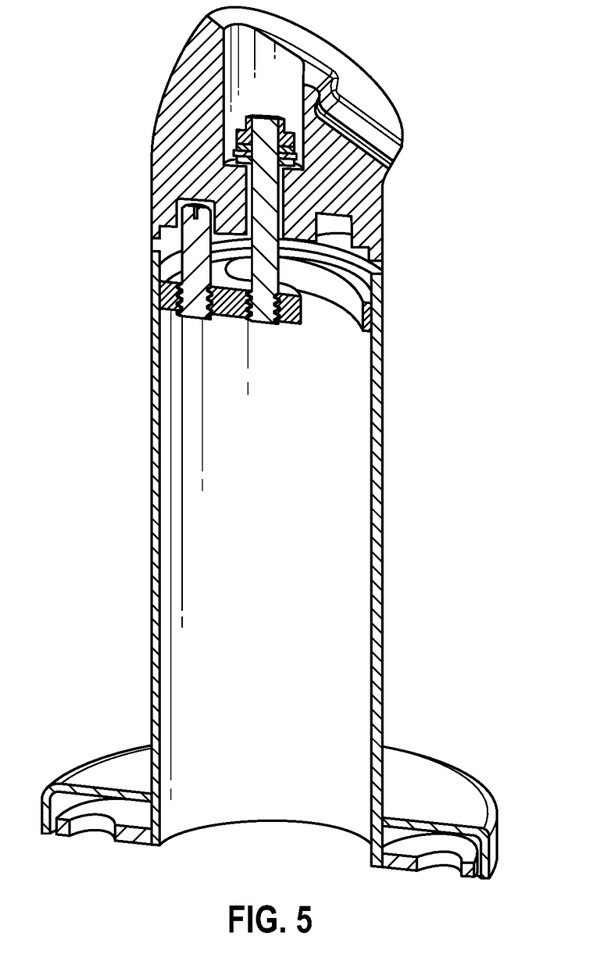
FIG. 5 shows a cross-section of a rotatable link with fixed tilt in accordance with various embodiments of the invention, where the body section is an angled tube.

FIG. 5 shows a cross-section of a rotatable link with fixed tilt, and where the body section is an angled tube.

Figure 6:
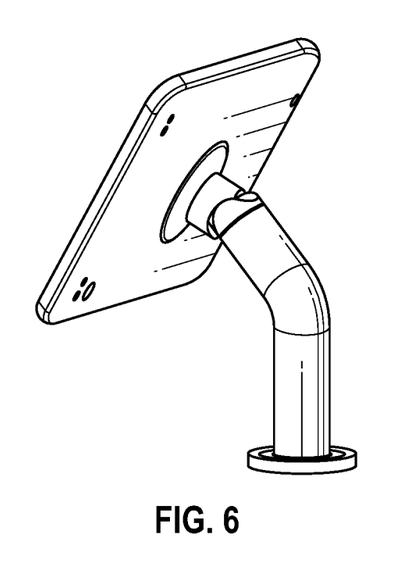
FIG. 6 shows an assembled version of a rotatable link with tilt function in accordance with various embodiments of the invention, and where the base unit is positioned in an angled tube.
Figure 7A:
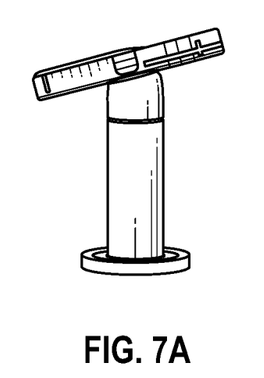
FIGS. 7A-7D show four rotatable links with fixed tilt in accordance with various embodiments of the invention, where the body section is a 15-60 degree angled tube.
Figure 7B:
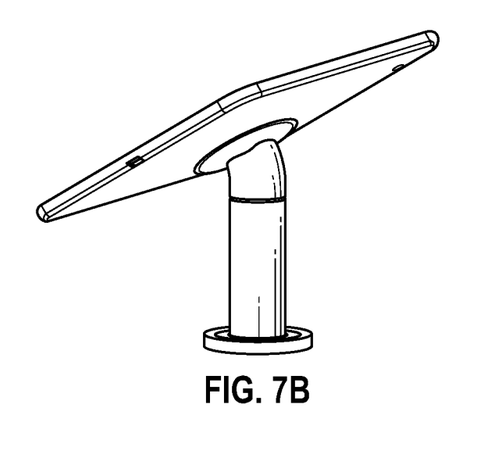
Figure 7C:
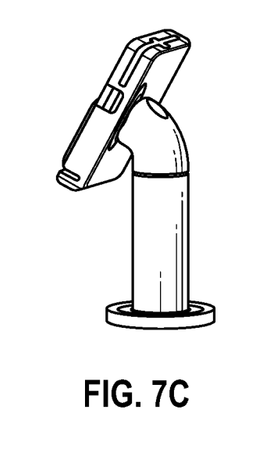
Figure 7D:
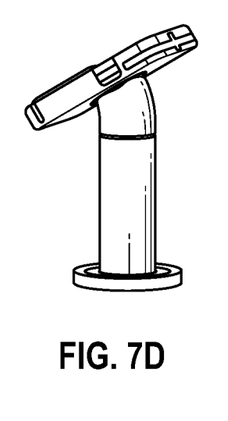

FIG. 6 shows an assembled version of a rotatable link with tilt function where the base unit is positioned in an angled tube.

FIGS. 7A-7D show four different rotatable links with fixed tilts. The body section is a 15-60 degree angled tube. A plate is attached to the body section on which a piece of hardware is mounted.

REFERENCES

100 Modular rotatable link
200 Base section
210 Base unit
212 Cable channel
220 Elongated member
222 First end
224 Second end
230 Stop pin
232 First end
234 Second end
300 Rotation ring
400 Body section
410 Bottom part
412 Channel
414 Cable channel
416 Rotation limiting channel
420 Tilt insert
421 First surface side
422 Channel
423 Second surface side
430 Tilt part
431 First surface side
432 Channel
433 Second surface side
434 Cable channel or cable plug
435 Threaded hole
500 Fastener
510 Curved washer
512 Channel
520 Washer system
521 Washer
530 Lock nut
600 Tube

The invention claimed is:

1. A modular rotatable link comprising:
a base section, a rotation ring, a body section, and a fastener;
wherein the base section comprises:
a) a base unit with a cable channel at least partly formed therein;
b) an elongated member with a first end attached to the base unit, and with a second end configured to be removably received by the fastener; and c) a stop pin with a first end attached to the base unit; wherein the body section comprises a bottom part configured for rotatably engaging with the rotation ring;

wherein the bottom part of the body section comprises:

a) a channel configured for rotatably engaging with the elongated member of the base section;

b) a cable channel in communication with the cable channel of the base section;

c) a rotation limiting channel configured for rotatably engaging with the stop pin of the base section;

wherein the body section further comprises a tilt insert and a tilt part;

wherein the tilt insert faces the bottom part;

wherein the tilt insert tiltably supports the tilt part, and the tilt part being tiltably mounted on the tilt insert; and wherein the tilt insert comprises a channel configured for rotatably engaging with the elongated member of the base section; wherein the tilt part comprises a channel configured for rotatably and tiltably engaging with the elongated member of the base section.

2. A modular rotatable link according to claim 1; wherein:

the body section further comprises a tilt insert and a tilt part;

wherein the tilt insert faces the bottom part; wherein the tilt insert comprises a channel configured for rotatably engaging with the elongated member of the base section;

wherein the tilt part comprises a channel configured for rotatably and tiltably engaging with the elongated member of the base section;

wherein the tilt insert has a first surface side and a second surface side;

wherein the first surface side is opposite to the second surface side;

wherein the first surface side is a curved convex surface tiltably supporting the tilt part;

wherein the tilt part has a first surface side and a second surface side;

wherein the first surface side is opposite to the second surface side; and wherein the second surface side is a curved concave surface configured for tiltably mounting and sliding on the first surface side of the tilt insert.

3. A modular rotatable link according to claim 2, wherein at least a the part of the first surface side of the tilt part comprising the channel configured for rotatably and tiltably engaging with the elongated member of the base section is a curved convex surface;

wherein the fastener comprises a curved washer configured for slideably engaging with the part of the first surface side of the tilt part comprising the channel configured for rotatably and tiltably engaging with the elongated member of the base section; and wherein the curved washer comprises a channel configured for rotatably engaging with the elongated member of the base section.

4. A modular rotatable link according to claim 1, wherein the fastener comprises a spring washer system and a lock nut.

5. A modular rotatable link according to claim 1, wherein the elongated member is positioned at the center of the base unit.

6. A modular rotatable link according to claim 5, wherein the cable channel at least partly formed in the base unit extends around the circumference of the elongated member.

7. A modular rotatable link according to claim 1, wherein the base unit is mounted in a tube, and wherein the tube is configured to support and accommodate at least a part of the rotation ring.

8. A modular rotatable link according to claim 1, wherein a part of the body section is configured as an angled tube.

9. A modular rotatable link according to claim 1, wherein the rotation limiting channel extends around the circumference of the channel configured for rotatably engaging with the elongated member of the base section.

* * * * *